United States Patent Office 2,910,454
Patented Oct. 27, 1959

2,910,454

HYDROCARBON POLYMERS STABILIZED WITH B-RESORCYLIC ACID DIESTERS

Gerald A. Clark, Midland, Carl B. Havens, Hope, and Ronald G. Brookens, Auburn, Mich., assignors to The Dow Chemical Company, Midland, Mich., a corporation of Delaware No Drawing. Original application August 2, 1956, Serial No. 601,643. Divided and this application July 9, 1958, Serial No. 747,369

4 Claims. (Cl. 260—45.85)

This invention relates to the stabilization of hydrocarbon polymers. More particularly it relates to a group of organic compounds useful in stabilizing hydrocarbon polymers to the degradative effects of ultra-violet light.

This application is a division of U.S. Serial No. 601,-643, filed August 2, 1956, now abandoned.

Hydrocarbon polymers, such as polyethylene, have found widespread and diversified use in preparing articles of commerce. Such polymers are economical to prepare and have a desirable family of physical properties, such as toughness and inertness to the common household solvents and foodstuffs. However, those polymers are subject to rapid and severe degradation when exposed to ultra-violet light. The consequences of that degradation are a yellowing, embrittlement, and a substantial reduction in physical properties, such as tensile strength, which are dependent upon the molecular architecture. Although the polymers prepared by some methods of polymerization are less stable than the polymers prepared by other methods, all of the hydrocarbon polymers have shown that lack of resistance to ultra-violet light. It would be desirable to have compositions based upon hydrocarbon polymers which would not be degraded on exposure to ultra-violet light for prolonged periods.

It is accordingly the principal object of this invention to provide a new group of organic compounds having the stated utility.

The above and related objects are accomplished by means of a group of stabilizers having the general formula:

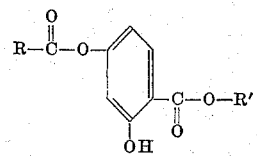

wherein R is selected from the group consisting of aryl, halophenyl, hydroxyphenyl and alkyl having from 1 to 7 carbon atoms, and R′ is selected from the group consisting of aryl, substituted aryl, and alkyl having from 1 to 8 carbon atoms. The objects are specifically realized with compositions containing such esters together with thermoplastic polymers.

The esters are easily prepared by conventional crossesterification or by direct esterification methods. In an illustrative preparation the methyl ester of β-resorcylic acid was prepared by the dropwise addition of 231 g. $H_2SO_4$ to 3 moles of β-resorcylic acid dissolved in 14 moles of distilled methanol. The solution was refluxed for 4¼ hours. The product was isolated by pouring the methanol solution into 2 liters of cold water, filtered and recrystallized twice from water. This methyl ester is a white crystalline material having a melting point of 118.6–118.8° C. The final ester was prepared by the dropwise addition of 0.5 mole acetyl chloride to 0.5 mole of β-resorcylic acid: methyl ester dissolved in 300 ml. of toluene, and 75 ml. of pyridine at room temperature. The reaction was allowed to continue for two hours at 75° C. The product was recovered by washing with 5.0 percent sodium bicarbonate, followed by water washing, revolatilization of solvent at 100 mm. Hg, and recrystallization from ethanol. This salicyclic acid: 4-acetoxy, methyl ester is a light tan crystalline material, melting point of 47.5–48.0° C. Other esters within the scope of the above general formula may be prepared by choosing the corresponding salicylates and acid chlorides and conducting the reaction in solvents, such as toluene, in the presence of the usual esterification catalysts, such as pyridine. Typical esters prepared in this manner are:

Salicylic acid—4-(2-ethylhexoxy), methyl ester
Salicylic acid—4-benzoxy, methyl ester
Salicylic acid—4 salicyloxy, ethyl ester
Salicylic acid—4-salicyloxy, phenyl ester
Salicylic acid—4-salicyloxy, 4-chlorophenyl ester
Salicylic acid—4-chlorobenzoxy, hexyl ester
Salicylic acid—4-chlorobenzoxy, 4-chlorophenyl ester
Salicylic acid—benzoxy, 2-ethylhexyl ester
Salicylic acid—benzoxy, 4-tert-butylphenyl ester The esters of this invention impart outstanding resistance to the degradative effects of ultra-violet light to compositions based upon hydrocarbon polymers. Typical of such polymers are polyethylene, polystyrene, polyisoprene, and similar polymers containing only carbon and hydrogen. Because the esters are white or colorless it is possible to prepare white transparent and pastel colored articles. The esters show this stabilizing effect when employed in amounts of from 0.5 to 10 percent by weight. Little stabilization is noticed when less than 0.5 percent by weight is used. Little additional benefit is apparent from using excessive amounts over 10 percent and the properties of any article which are dependent upon the polymer may suffer.

The advantages of the esters will be more apparent from the following example wherein all parts and percentages are by weight.

Sample compositions were prepared from a high density (0.95) polyethylene of about 60,000 molecular weight with 0.5 percent of a stabilizer of this invention. One composition was left as a blank. The compositions were extruded into monofilaments having diameters of 0.01 inch which were exposed to ultra-violet sunlamps for seven days. The degree of degradation was determined by measuring the tensile strength before and after exposure. The results, reported as percent retention of tensile strength, are listed in Table I.

Table I

| Stabilizer | Original tensile strength | Percent retention of tensile strength |
|---|---|---|
| None | 43,000 | 20 |
| 4-benzoxy salicylic acid: phenyl ester | 43,000 | 64 |
| 4-benzoxy salicylic acid: methyl ester | 43,000 | 62 |

The stabilizing effectiveness of the esters is readily apparent from the above results. Similar results are attained when the stabilizers are employed with polystyrene.

We claim:

1. A thermoplastic composition comprising a thermoplastic hydrocarbon polymer and from 0.5 to 10 percent by weight of said polymer of an ester having the general formula:

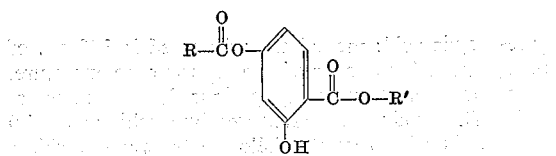

wherein R is selected from the group consisting of phenyl, halophenyl, hydroxyphenyl and alkyl having from 1 to 7 carbon atoms, and R' is selected from the group consisting of phenyl, halophenyl, alkaryl, and alkyl having from 1 to 8 carbon atoms.

2. The composition claimed in claim 1, wherein said polymer is polyethylene.

3. The composition claimed in claim 2, wherein the ester is 4-benzoxy salicylic acid: phenyl ester.

4. The composition claimed in claim 2, wherein the ester is 4-benzoxy salicylic acid: methyl ester.

No references cited.